US009286623B2

(12) United States Patent
Raichelgauz et al.

(10) Patent No.: US 9,286,623 B2
(45) Date of Patent: Mar. 15, 2016

(54) METHOD FOR DETERMINING AN AREA WITHIN A MULTIMEDIA CONTENT ELEMENT OVER WHICH AN ADVERTISEMENT CAN BE DISPLAYED

(71) Applicant: Cortica, Ltd., Tirat Carmel (IL)

(72) Inventors: Igal Raichelgauz, Ramat Gan (IL);
Karina Odinaev, Ramat Gan (IL);
Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 111 days.

(21) Appl. No.: 13/874,195

(22) Filed: Apr. 30, 2013

(65) Prior Publication Data

US 2013/0246166 A1    Sep. 19, 2013

Related U.S. Application Data

(63) Continuation-in-part of application No. 13/624,397, filed on Sep. 21, 2012, which is a continuation-in-part of application No. 13/344,400, filed on Jan. 5, 2012, now Pat. No. 8,959,037, which is a continuation of (Continued)

(30) Foreign Application Priority Data

Oct. 26, 2005  (IL) .......................................... 171577
Jan. 29, 2006  (IL) .......................................... 173409
Aug. 21, 2007  (IL) .......................................... 185414

(51) Int. Cl.
G06N 5/02       (2006.01)
H04N 21/466    (2011.01)
H04N 21/81     (2011.01)

(Continued)

(52) U.S. Cl.
CPC .............. *G06Q 30/0246* (2013.01); *G06N 5/02* (2013.01); *H04H 20/103* (2013.01); *H04H 60/37* (2013.01); *H04H 60/59* (2013.01); *H04H 60/66* (2013.01); *H04N 7/17318* (2013.01);

(Continued)

(58) Field of Classification Search
None
See application file for complete search history.

(56) References Cited

U.S. PATENT DOCUMENTS 4,972,363 A    11/1990  Nguyen et al.
5,978,754 A    11/1999  Kumano (Continued)

FOREIGN PATENT DOCUMENTS

WO      02/31764       4/2002
WO      2007/049282    5/2007

OTHER PUBLICATIONS

Guo et al, AdOn: An Intelligent Overlay Video Advertising System, 2009.*

(Continued)

*Primary Examiner* — Stanley K Hill
*Assistant Examiner* — Mikayla Chubb
(74) *Attorney, Agent, or Firm* — M&B IP Analysts, LLC

(57) ABSTRACT

A method and system for detecting at least an advertising attractive area within a multimedia content element over which an advertisement item can be displayed. The method comprises extracting the multimedia content element from a web-page; partitioning the multimedia content element into a predefined number of portions; generating at least one signature for each portion of the multimedia content element; analyzing the at least one signature generated for each portion of the multimedia content elements; and identifying at least one attractive advertising area within the multimedia content element based on the signature analysis.

18 Claims, 7 Drawing Sheets

Related U.S. Application Data application No. 12/434,221, filed on May 1, 2009, now Pat. No. 8,112,376, said application No. 13/624,397 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 13/624,397 is a continuation-in-part of application No. 12/084,150, filed as application No. PCT/IL2006/001235 on Oct. 26, 2006, now Pat. No. 8,655,801.

(60) Provisional application No. 61/789,378, filed on Mar. 15, 2013.

(51) Int. Cl.
*H04H 60/59* (2008.01)
*G06Q 30/02* (2012.01)
*H04H 20/10* (2008.01)
*H04H 60/37* (2008.01)
*H04H 60/66* (2008.01)
*H04N 7/173* (2011.01)
*H04N 21/258* (2011.01)
*H04N 21/2668* (2011.01)

(52) U.S. Cl.
CPC .... *H04N 21/25891* (2013.01); *H04N 21/2668* (2013.01); *H04N 21/466* (2013.01); *H04N 21/8106* (2013.01)

(56) References Cited

U.S. PATENT DOCUMENTS

| | | | |
|---|---|---|---|
| 6,052,481 A | 4/2000 | Grajski et al. |
| 6,076,088 A | 6/2000 | Paik et al. |
| 6,122,628 A | 9/2000 | Castelli et al. |
| 6,128,651 A | 10/2000 | Cezar |
| 6,243,375 B1 | 6/2001 | Speicher |
| 6,381,656 B1 | 4/2002 | Shankman |
| 6,422,617 B1 | 7/2002 | Fukumoto et al. |
| 6,611,628 B1 | 8/2003 | Sekiguchi et al. |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,751,613 B1 | 6/2004 | Lee et al. |
| 6,754,435 B2 | 6/2004 | Kim |
| 6,763,519 B1 | 7/2004 | McColl et al. |
| 6,804,356 B1 | 10/2004 | Krishnamachari |
| 6,819,797 B1 | 11/2004 | Smith et al. |
| 6,901,207 B1 | 5/2005 | Watkins |
| 7,006,689 B2 | 2/2006 | Kasutani |
| 7,013,051 B2 | 3/2006 | Sekiguchi et al. |
| 7,020,654 B1 | 3/2006 | Najmi |
| 7,047,033 B2 | 5/2006 | Wyler |
| 7,260,564 B1 | 8/2007 | Lynn et al. |
| 7,302,117 B2 | 11/2007 | Sekiguchi et al. |
| 7,313,805 B1 | 12/2007 | Rosin et al. |
| 7,340,458 B2 | 3/2008 | Vaithilingam et al. |
| 7,353,224 B2 | 4/2008 | Chen et al. |
| 7,376,672 B2 | 5/2008 | Weare |
| 7,376,722 B1 | 5/2008 | Sim et al. |
| 7,433,895 B2 | 10/2008 | Li et al. |
| 7,464,086 B2 | 12/2008 | Black et al. |
| 7,526,607 B1 | 4/2009 | Singh et al. |
| 7,536,417 B2 | 5/2009 | Walsh et al. |
| 7,574,668 B2 | 8/2009 | Nunez et al. |
| 7,660,737 B1 | 2/2010 | Lim et al. |
| 7,694,318 B2 | 4/2010 | Eldering et al. |
| 7,697,791 B1 | 4/2010 | Chan et al. |
| 7,769,221 B1 | 8/2010 | Shakes et al. |
| 7,788,132 B2 | 8/2010 | Desikan et al. |
| 7,860,895 B1 | 12/2010 | Scofield et al. |
| 7,904,503 B2 | 3/2011 | Van De Sluis |
| 7,920,894 B2 | 4/2011 | Wyler |
| 7,921,107 B2 | 4/2011 | Chang et al. |
| 7,974,994 B2 | 7/2011 | Li et al. |
| 7,987,194 B1 | 7/2011 | Walker et al. |
| 7,991,715 B2 | 8/2011 | Schiff et al. |
| 8,000,655 B2 | 8/2011 | Wang et al. |
| 8,098,934 B2 | 1/2012 | Vincent et al. |
| 8,266,185 B2 | 9/2012 | Raichelgauz et al. |
| 8,312,031 B2 | 11/2012 | Raichelgauz et al. |
| 8,316,005 B2 | 11/2012 | Moore |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 2001/0019633 A1 | 9/2001 | Tenze et al. |
| 2001/0056427 A1 | 12/2001 | Yoon et al. |
| 2002/0107827 A1 | 8/2002 | Benitez-Jimenez et al. |
| 2002/0123928 A1 | 9/2002 | Eldering et al. |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0078766 A1 | 4/2003 | Appelt et al. |
| 2003/0191764 A1 | 10/2003 | Richards |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0128142 A1 | 7/2004 | Whitham |
| 2004/0128511 A1 | 7/2004 | Sun et al. |
| 2004/0153426 A1 | 8/2004 | Nugent |
| 2004/0249779 A1 | 12/2004 | Nauck et al. |
| 2005/0177372 A1 | 8/2005 | Wang et al. |
| 2006/0020860 A1 | 1/2006 | Tardif et al. |
| 2006/0026203 A1 | 2/2006 | Tan et al. |
| 2006/0031216 A1 | 2/2006 | Semple et al. |
| 2006/0064037 A1 | 3/2006 | Shalon et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0204035 A1 | 9/2006 | Guo et al. |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0248558 A1 | 11/2006 | Barton et al. |
| 2006/0253423 A1 | 11/2006 | McLane et al. |
| 2007/0074147 A1 | 3/2007 | Wold |
| 2007/0130159 A1 | 6/2007 | Gulli et al. |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0294295 A1 | 12/2007 | Finkelstein et al. |
| 2008/0040277 A1 | 2/2008 | DeWitt |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0163288 A1 | 7/2008 | Ghosal et al. |
| 2008/0165861 A1 | 7/2008 | Wen et al. |
| 2008/0201299 A1 | 8/2008 | Lehikoinen et al. |
| 2008/0201314 A1 | 8/2008 | Smith et al. |
| 2008/0204706 A1 | 8/2008 | Magne et al. |
| 2008/0253737 A1 | 10/2008 | Kimura et al. |
| 2008/0270373 A1 | 10/2008 | Oostveen et al. |
| 2008/0313140 A1 | 12/2008 | Pereira et al. |

(56) References Cited

U.S. PATENT DOCUMENTS

| | | |
|---|---|---|
| 2009/0013414 A1 | 1/2009 | Washington et al. |
| 2009/0089587 A1 | 4/2009 | Brunk et al. |
| 2009/0119157 A1 | 5/2009 | Dulepet |
| 2009/0125529 A1 | 5/2009 | Vydiswaran et al. |
| 2009/0148045 A1 | 6/2009 | Lee et al. |
| 2009/0172030 A1 | 7/2009 | Schiff et al. |
| 2009/0175538 A1 | 7/2009 | Bronstein et al. |
| 2009/0204511 A1 | 8/2009 | Tsang |
| 2009/0216639 A1 | 8/2009 | Kapczynski et al. |
| 2009/0245603 A1 | 10/2009 | Koruga et al. |
| 2009/0253583 A1 | 10/2009 | Yoganathan |
| 2009/0277322 A1 | 11/2009 | Cai et al. |
| 2010/0023400 A1 | 1/2010 | Dewitt |
| 2010/0082684 A1 | 4/2010 | Churchill et al. |
| 2010/0088321 A1 | 4/2010 | Solomon et al. |
| 2010/0104184 A1 | 4/2010 | Bronstein et al. |
| 2010/0106857 A1 | 4/2010 | Wyler |
| 2010/0162405 A1 | 6/2010 | Cook et al. |
| 2010/0191567 A1 | 7/2010 | Lee et al. |
| 2010/0268524 A1 | 10/2010 | Nath et al. |
| 2010/0318493 A1 | 12/2010 | Wessling |
| 2010/0322522 A1 | 12/2010 | Wang et al. |
| 2011/0035289 A1 | 2/2011 | King et al. |
| 2011/0055585 A1 | 3/2011 | Lee |
| 2011/0106782 A1 | 5/2011 | Ke et al. |
| 2011/0145068 A1 | 6/2011 | King et al. |
| 2011/0202848 A1* | 8/2011 | Ismalon .................. 715/738 |
| 2011/0208822 A1 | 8/2011 | Rathod |
| 2011/0251896 A1 | 10/2011 | Impollonia et al. |
| 2011/0313856 A1 | 12/2011 | Cohen et al. |
| 2012/0131454 A1 | 5/2012 | Shah |
| 2012/0167133 A1 | 6/2012 | Carroll et al. |
| 2012/0197857 A1 | 8/2012 | Huang et al. |
| 2012/0330869 A1 | 12/2012 | Durham |
| 2013/0067035 A1 | 3/2013 | Amanat et al. |
| 2013/0086499 A1 | 4/2013 | Dyor et al. |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2015/0289022 A1 | 10/2015 | Gross |

OTHER PUBLICATIONS

Mei et al, VideoSense: Towards Effective Online Video Advertising, 2007.*

Mei et al, Contextual In-Image Advertising, 2008.*

Foote, Jonathan, et al. "Content-Based Retrieval of Music and Audio", 1997 Institute of Systems Science, National University of Singapore, Singapore (Abstract).

Ribert et al. "An Incremental Hierarchical Clustering", Visicon Interface 1999, pp. 586-591.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

IPO Examination Report under Section 18(3) for corresponding UK application No. GB1001219.3, dated May 30, 2012.

IPO Examination Report under Section 18(3) for corresponding UK application No. GB1001219.3, dated Sep. 12, 2011.

Lin, C.; Chang, S.: "Generating Robust Digital Signature for ImageNideo Authentication", Multimedia and Security Workshop at ACM Mutlimedia '98; Bristol, U.K., Sep. 1998; pp. 49-54.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Maass, W. et al.: "Computational Models for Generic Cortical Microcircuits", Institute for Theoretical Computer Science, Technische Universitaet Graz, Graz, Austria, published Jun. 10, 2003.

International Search Report for the corresponding International Patent Application PCT/IL2006/001235; Date of Mailing: Nov. 2, 2008.

Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.

Jaeger, H.: "The "echo state" approach to analysing and training recurrent neural networks", GMD Report, No. 148, 2001, pp. 1-43, XP002466251. German National Research Center for Information Technology.

Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

International Search Authority: "Written Opinion of the International Searching Authority" (PCT Rule 43bis.1) including International Search Report for International Patent Application No. PCT/US2008/073852; Date of Mailing: Jan. 28, 2009.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

International Search Authority: International Preliminary Report on Patentability (Chapter I of the Patent Cooperation Treaty) including "Written Opinion of the International Searching Authority" (PCT

(56) References Cited

OTHER PUBLICATIONS

Rule 43bis. 1) for the corresponding International Patent Application No. PCT/IL2006/001235; Date of Issuance: Jul. 28, 2009.
Boari et al, "Adaptive Routing for Dynamic Applications in Massively Parallel Architectures", 1995 IEEE, Spring 1995.
Cococcioni, et al, "Automatic Diagnosis of Defects of Rolling Element Bearings Based on Computational Intelligence Techniques", University of Pisa, Pisa, Italy, 2009.
Emami, et al, "Role of Spatiotemporal Oriented Energy Features for Robust Visual Tracking in Video Surveillance, University of Queensland", St. Lucia, Australia, 2012.
Garcia, "Solving the Weighted Region Least Cost Path Problem Using Transputers", Naval Postgraduate School, Monterey, California, Dec. 1989.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.
Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Theodoropoulos et al, "Simulating Asynchronous Architectures on Transputer Networks", Proceedings of the Fourth Euromicro Workshop on Parallel and Distributed Processing, 1996. PDP '96.
Semizarov et al. "Specificity of Short Interfering RNA Determined through Gene Expression Signatures", PNAS, 2003, pp. 6347-6352.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/ TMM.2014.2359332 IEEE Journals & Magazines.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/ TELFOR.2012.6419494 IEEE Conference Publications.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Wang et al. "A Signature for Content-based Image Retrieval Using a Geometrical Transform", ACM 1998, pp. 229-234.
Zang, et al., "A New Multimedia Message Customizing Framework for Mobile Devices", Multimedia and Expo, 2007 IEEE International Conference on Year: 2007, pp. 1043-1046, DOI: 10.1109/ICME. 2007.4284832 IEEE Conference Publications.

* cited by examiner

METHOD FOR DETERMINING AN AREA WITHIN A MULTIMEDIA CONTENT ELEMENT OVER WHICH AN ADVERTISEMENT CAN BE DISPLAYED

CROSS-REFERENCE TO RELATED APPLICATIONS

This application claims the benefit of U.S. provisional application No. 61/789,378 filed Mar. 15, 2013 and is a continuation-in-part (CIP) application of U.S. patent application Ser. No. 13/624,397 filed on Sep. 21, 2012, now pending. The 13/624,397 application is a CIP application of:
- (a) U.S. patent application Ser. No. 13/344,400 filed on Jan. 5, 2012, now pending, which is a continuation of U.S. patent application Ser. No. 12/434,221, filed May 1, 2009, now U.S. Pat. No. 8,112,376;
- (b) U.S. patent application Ser. No. 12/195,863, filed Aug. 21, 2008, now U.S. Pat. No. 8,326,775, which claims priority under 35 USC 119 from Israeli Application No. 185414, filed on Aug. 21, 2007, and which is also a continuation-in-part of the below-referenced U.S. patent application Ser. No. 12/084,150; and
- (c) U.S. patent application Ser. No. 12/084,150 having a filing date of Apr. 7, 2009, now pending, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006.

All of the applications referenced above are herein incorporated by reference for all that they contain.

TECHNICAL FIELD

The present invention relates generally to the analysis of multimedia content, and more specifically to a method for determining an area within multimedia content over which an advertisement can be displayed.

BACKGROUND

The Internet, also referred to as the worldwide web (WWW), has become a mass media whereby the content presentation is largely supported by paid advertisements that are added to the web-page content. Typically, advertisements are displayed using portions of code written in, for example, hyper-text mark-up language (HTML) or JavaScript that is inserted into, or otherwise called up by HTML documents (web-pages). A web-page typically contains text and multimedia elements, such images, video clips, audio clips, and the like that are rendered and displayed by a web browser on a display device.

One of the most common types of advertisements on the Internet is in a form of a banner advertisement. Banner advertisements are generally images or animations that are displayed within a web-page. Other advertisements are simply inserted at various locations within the display area of the HTML document forming the web-page. A typical web-page is cluttered with many advertisement banners, which frequently are irrelevant to the content being displayed in the web-page. As a result, the user's attention is not given to the advertised content. Consequently, the price for advertising in a potentially valuable area within a web-page is low because its respective effectiveness is low.

It would therefore be advantageous to provide a solution that would attract viewers' attention to advertised content and thereby increase the price of advertising areas within web-pages.

SUMMARY

Certain exemplary embodiments disclosed herein include a method for detecting at least an advertising attractive area within a multimedia content element over which an advertisement item can be displayed. The method comprises extracting the multimedia content element from a web-page; partitioning the multimedia content element into a predefined number of portions; generating at least one signature for each portion of the multimedia content element; analyzing the at least one signature generated for each portion of the multimedia content elements; and identifying at least one attractive advertising area within the multimedia content element based on the signature analysis.

Certain exemplary embodiments disclosed herein also include system for detecting at least an advertising attractive area within a multimedia content element over which an advertisement item can be displayed. The system comprises an interface to a network for receiving a web-page containing at least one multimedia content element; and a processing unit configured to: extract the multimedia content element from a web-page; partition the multimedia content element into a predefined number of portions; analyze at least one signature generated for each portion of the multimedia content element; and identify at least one attractive advertising area within the multimedia content element based on the signature analysis.

BRIEF DESCRIPTION OF THE DRAWINGS

The disclosed subject matter is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
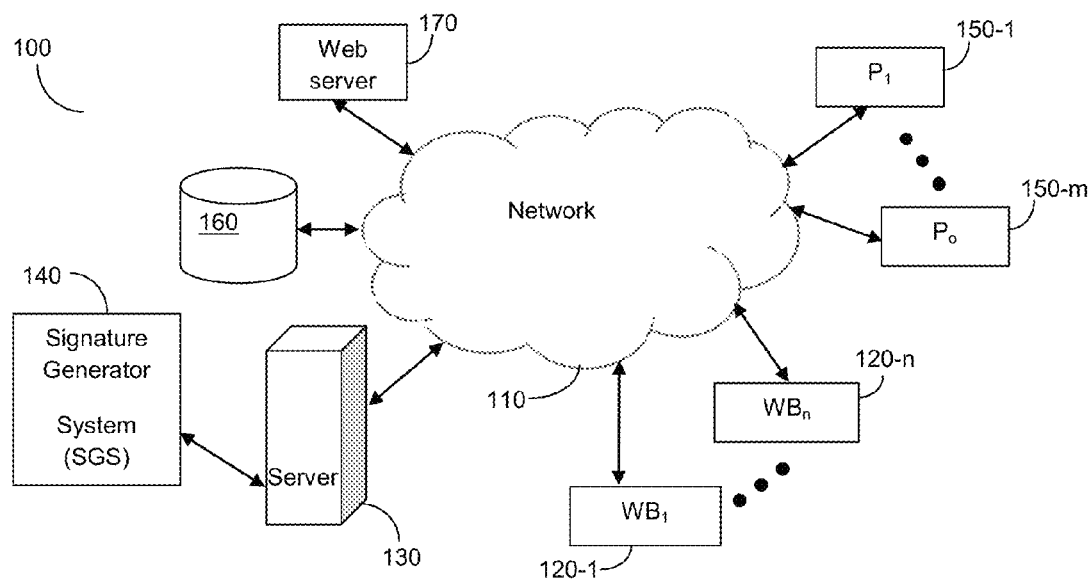
FIG. 1 is a schematic block diagram of a network system utilized to describe various embodiments of the invention.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The disclosed techniques are based on a system designed to allow matching at least an appropriate advertisement that is relevant to a multimedia content displayed in a web-page, and analyzing the multimedia content displayed on the web-page accordingly. Based on the analysis results, for one or more multimedia content elements included in the web-page, one or more matching signatures are generated. The signatures are utilized to search for appropriate advertisements to be displayed in the web-page. According to disclosed embodiments, an advertisement is matched to a multimedia element displayed in web-page, based on the content of the element. Furthermore, the disclosed embodiment determines the most attractive area within the multimedia element that the advertisement can be displayed in order to attract the viewer's attention.

FIG. 1 shows an exemplary and non-limiting schematic diagram of a network system 100 utilized to describe the disclosed embodiments. A network 110 is used to communicate between different parts of the system. The network 110 may be the Internet, the world-wide-web (WWW), a local area network (LAN), a wide area network (WAN), a metro area network (MAN), and other networks capable of enabling communication between the elements of the system 100.

Further connected to the network 110 are one or more client applications, such as web browsers (WB) 120-1 through 120-$n$ (collectively referred hereinafter as web browsers 120 or individually as a web browser 120). A web browser 120 is executed over a computing device including, for example, a personal computer (PC), a personal digital assistant (PDA), a mobile phone, a tablet computer, and other kinds of wired and mobile appliances, equipped with browsing, viewing, listening, filtering, and managing capabilities etc., that are enabled as further discussed herein below.

A web server 170 is further connected to the network 110 and may provide to a web browser 120 web-pages containing multimedia content, or references therein, such that upon request by a web browser 120, such multimedia content is provided to the web browser 120. The system 100 also includes a signature generator system (SGS) 140. In one embodiment, the SGS 140 is connected to a server 130. The server 130 is enabled to receive and serve multimedia content and causes the SGS 140 to generate a signature respective of the multimedia content. Specifically, the server 130 together with the SGS 140 perform the process of matching an advertisement to a multimedia content element displayed in a web-page and determining the most attractive area within the multimedia element to display the advertisement according to various disclosed embodiments discussed in detail below. The process for generating the signatures for multimedia content by the SGS 140, is explained in more detail herein below with respect to FIGS. 3 and 4. It should be noted that each of the server 130 and the SGS 140, typically comprises a processing unit, such as a processor (not shown) that is coupled to a memory. The memory contains instructions that can be executed by the processing unit. The server 130 also includes an interface (not shown) to the network 110.

A plurality of publisher servers $P_1$ 150-1 through $P_m$ 150-$m$ (collectively referred to hereinafter as publisher servers 150, or individually as a publisher server 150) are also connected to the network 110, each of which is configured to generate and send online advertisements to the server 130 and web-server 170. The publisher servers 150 typically receive the advertised content from advertising agencies that place the advertising campaign. In one embodiment, the advertisements may be stored in a data warehouse 160 which is connected to the server 130 (either directly or through the network 110) for further use.

A user visits a web-page, hosted in the web-server 170, using a web-browser 120. When the web-page is uploaded on the user's web-browser 120, a request is sent to the server 130 to analyze the multimedia content elements contained in the web-page. The request to analyze the multimedia elements content can be generated and sent by a script executed in the web-page, an agent installed in the web-browser, or by one of the publisher servers 150 when requested to upload one or more advertisements to the web-page. The request to analyze the multimedia content may include a URL of the web-page or a copy of the web-page. The request may also include multimedia content elements extracted from the web-page. A multimedia content element may include, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof.

The server 130 analyzes the multimedia content elements in the web-page to detect one or matching advertisements for the multimedia content elements. It should be noted that the server 130 may analyze all or a sub-set of the multimedia content elements contained in the web-page. It should be further noted that the number of matching advertisements that are provided for the analysis can be determined based on the number of advertisement banners that can be displayed on the web-page, or in response to a request pre-configured by a campaign manager.

The SGS 140 generates for each multimedia content element provided by the server 130 at least one signature. The at least one generated signature may be robust to noise and distortions as discussed below. Then, using the generated signature(s) the server 130 searches the data warehouse 160 for a matching advertisement. For example, if the signature of an image indicates a "sea shore" then an advertisement for a swimsuit can be a potential matching advertisement.

Figure 7:
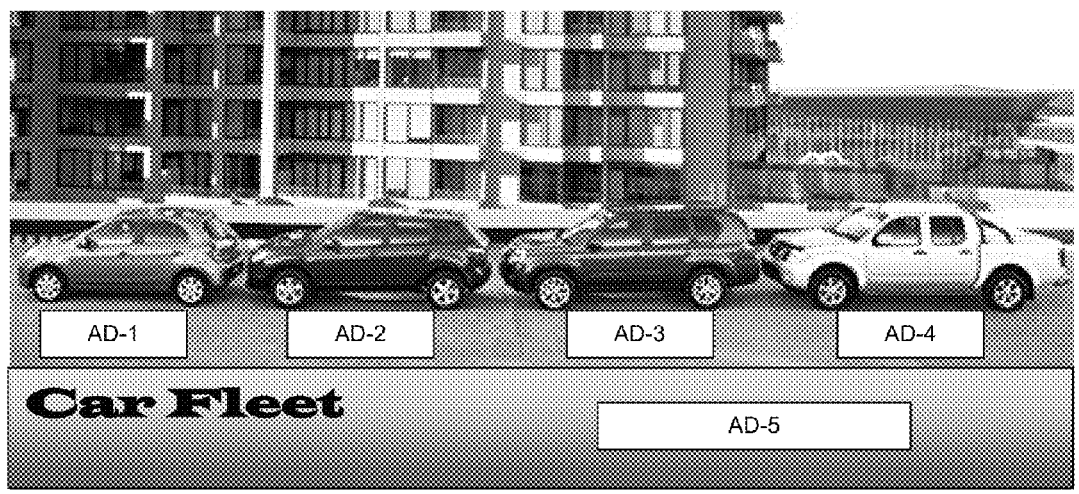

However, typically a multimedia content element includes many details, and is composed of different content portions, each of which may be of a different type and related to a different object. For example, a picture 700 shown in FIG. 7 is composed of the text "Our Fleet" and images of 4 different cars (color or model), a road, and a building as a background.

According to the embodiments disclosed, the server 130 matches an advertisement to be placed over the multimedia content element based on the various content portions included in the element. The server 130 further determines an area within the multimedia content element over which an advertisement can be placed, such that it would not distract the viewer's attention away from the advertised content and the displayed element, but rather it would attract the user to the displayed content. In another embodiment, the server 130 matches an advertisement for more than one content portion included therein.

For example, the server 130 may process the picture 700 by means of the SGS 140 which generates at least one signature for each content portion of the picture. Based on the generated signatures the server matches an advertisement for one or more cars displayed in the picture 700, and matches another advertisement that relates to all cars. Based on the signatures analysis the server 130 determines an area, for display of each of the advertisements, within the multimedia content element. The determination is based on at least one of the area's texture, visibility, contrast, relativity to the advertisement content, distance from other content portions, and so on. For example, AD-1, AD-2, AD-3, and AD-4 each relate to a specific car's model and are displayed below each model, while AD-5 is for a dealership and is displayed next to the text "Our Fleet".

It should be noted that the signatures generated for the picture 700 would enable accurate recognition of the model of the car because the signatures generated for the multimedia content elements, according to the disclosed embodiments, allow for recognition and classification of multimedia elements, such as, content-tracking, video filtering, multimedia taxonomy generation, video fingerprinting, speech-to-text, audio classification, element recognition, video/image search and any other applications requiring content-based signatures generation and matching for large content volumes such as, web and other large-scale databases.

In one embodiment, the signatures generated for more than one multimedia content element are clustered. The clustered signatures are used to search for a matching advertisement. In one embodiment, the one or more selected matching advertisements are retrieved from the data warehouse 160 and are placed in the one or more determined areas within the multimedia content element by the server 130. Then, the composed element including the matching advertisements is uploaded to the web-page on the web browser 120 by means of one of the publisher servers 150. Alternatively, the matching advertisements may be provided to the publisher servers 150 with instructions as to where to place each advertisement in the web-page. The instructions may include the element ID in the web-page, a URL of the web-page, coordinates within the web-page and/or element in which to place the advertisements, and so on. The matching advertisements are overlaid on top of the content element.

Figure 2:
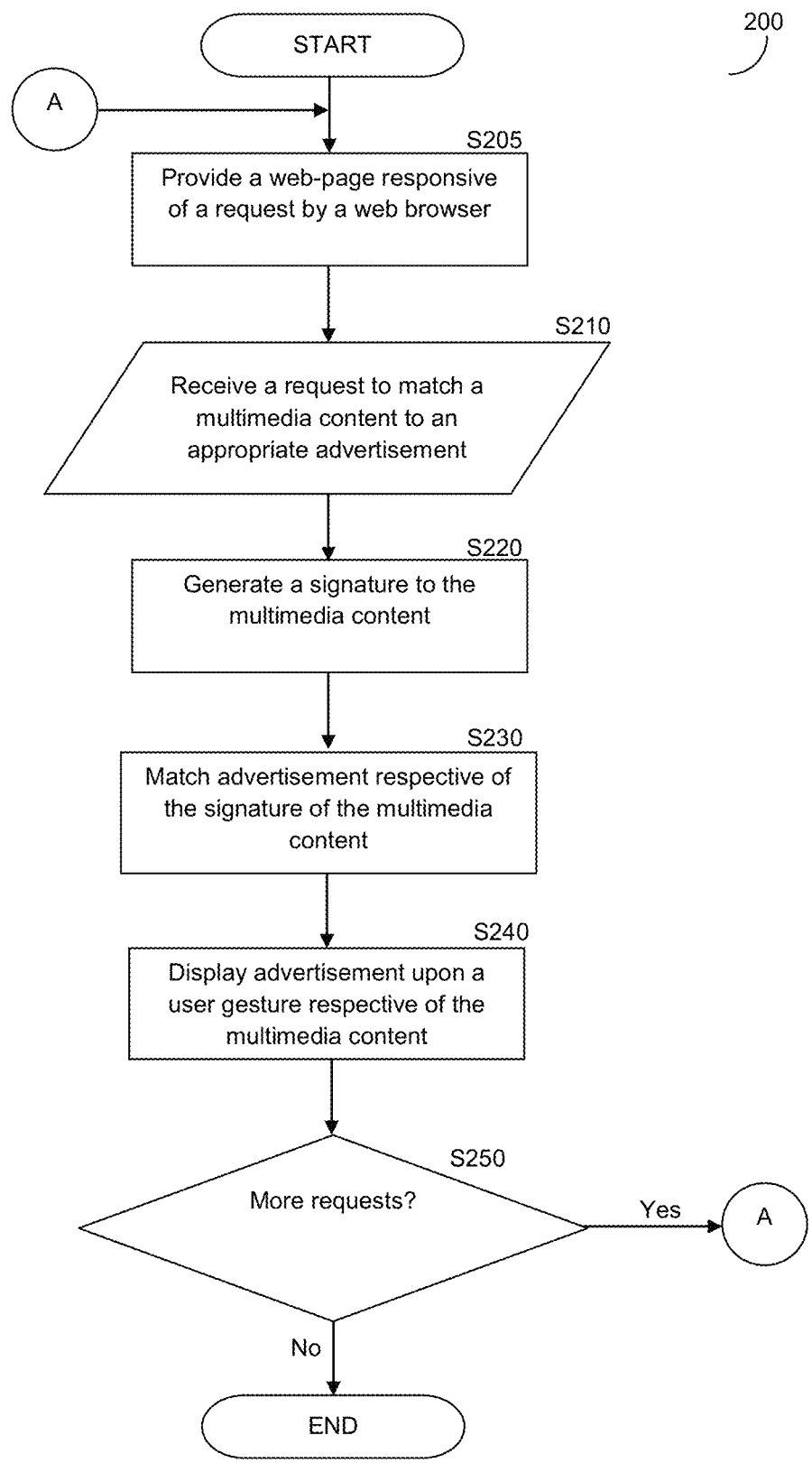
FIG. 2 is a flowchart describing a process of matching an advertisement to multimedia content displayed on a web-page.

FIG. 2 depicts an exemplary and non-limiting flowchart 200 describing the process of matching an advertisement to multimedia content displayed on a web-page. At S205, the method starts when a web-page is provided responsive of a request by one of the web-browsers (e.g., web-browser 120-1). In S210, a request to match at least one multimedia content element contained in the uploaded web-page to an appropriate advertisement item is received. The request can be received from a publisher server (e.g., a server 150-1), a script running on the uploaded web-page, or an agent (e.g., an add-on) installed in the web-browser. S210 can also include extracting the multimedia content elements for a signature that should be generated.

In S220, a signature for the multimedia content element is generated. The signature for the multimedia content element generated by a signature generator is described below. In S230, an advertisement item is matched to the multimedia content element respective of its generated signature. In one embodiment, the matching process includes searching for at least one advertisement item respective of the signature of the multimedia content and a display of the at least one advertisement item within the display area of the web-page. In one embodiment, the matching of an advertisement to a multimedia content element can be performed by the computational cores that are part of a large scale matching discussed in detail below.

In S240, upon a user's gesture the advertisement item is uploaded to the web-page and displayed therein. The user's gesture may be: a scroll on the multimedia content element, a press on the multimedia content element, and/or a response to the multimedia content. This ensures that the user's attention is given to the advertized content. In S250 it is checked whether there are additional requests to analyze multimedia content elements, and if so, execution continues with S210; otherwise, execution terminates.

As a non-limiting example, a user uploads a web-page that contains an image of a sea shore. The image is then analyzed and a signature is generated respective thereto. Respective of the image signature, an advertisement item (e.g., a banner) is matched to the image, for example, a swimsuit advertisement. Upon detection of a user's gesture, for example, a mouse scrolling over the sea shore image, the swimsuit ad is displayed.

The web-page may contain a number of multimedia content elements; however, in some instances only a few advertisement items may be displayed in the web-page. Accordingly, in one embodiment, the signatures generated for the multimedia content elements are clustered and the cluster of signatures is matched to one or more advertisement items.

Figure 3:
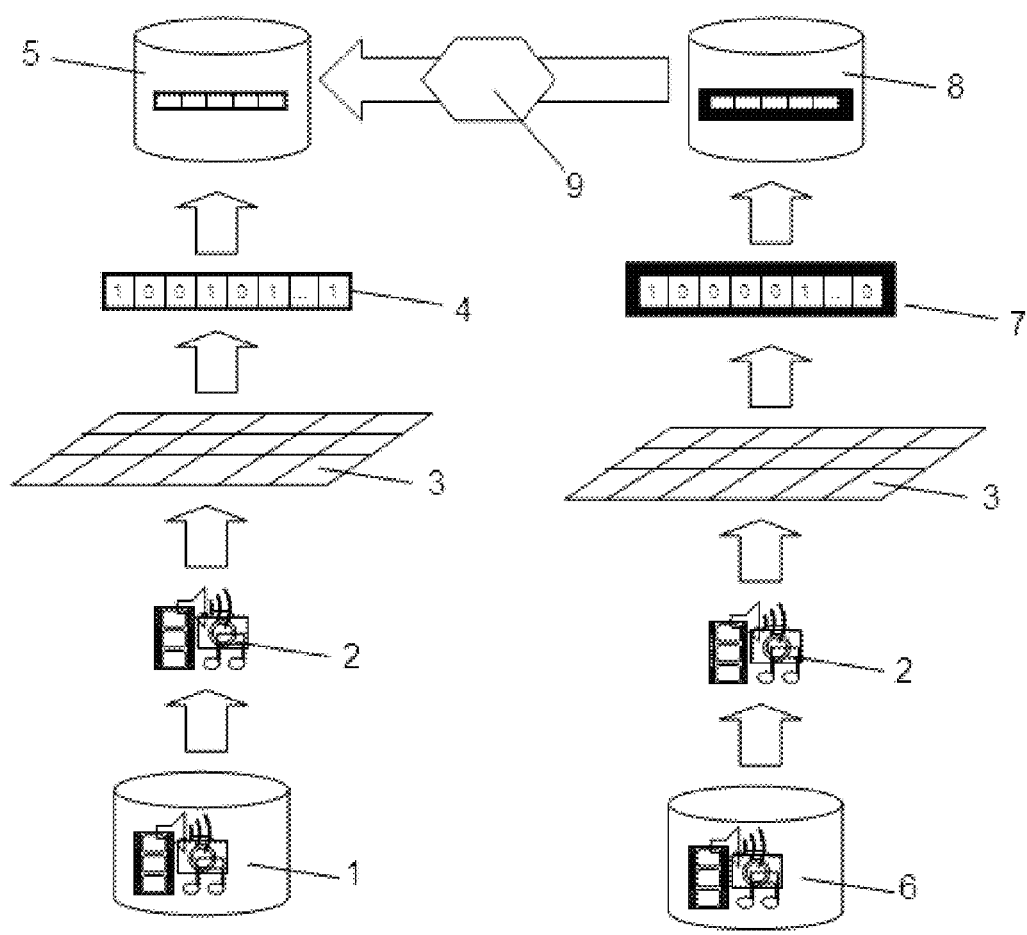
FIG. 3 is a block diagram depicting a basic flow of information in the signature generator system.
Figure 4:
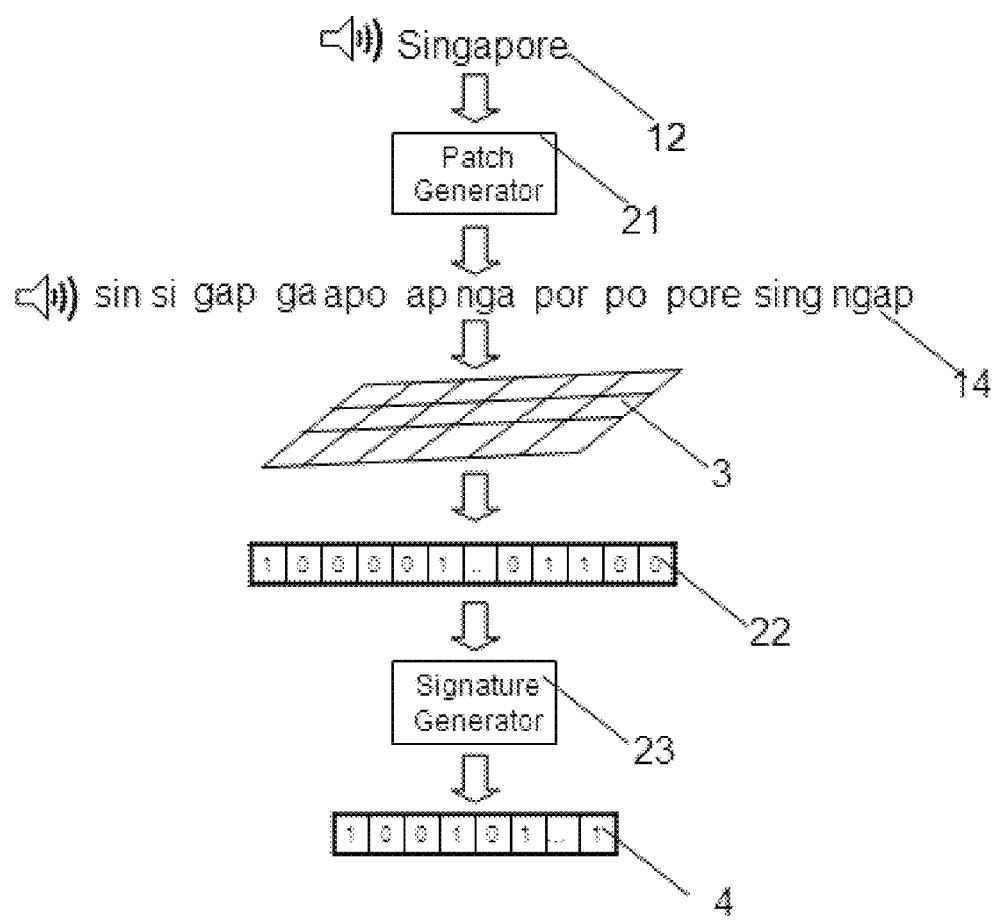
FIG. 4 is a diagram showing a flow of patches generation, response vector generation, and signature generation in a large-scale speech-to-text system.

FIGS. 3 and 4 illustrate the generation of signatures for the multimedia content elements by the SGS 140 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame T is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $Ci=\{n_i\}$ (1≤i≤L) may consist of a single leaky integrate-to-threshold unit (LTU) node or more nodes. The node $n_i$ equations are:

$$V_i = \sum_j w_{ij} k_j$$

$$n_i = \Box(V_i - Th_x)$$

where, $\Box$ is a Heaviside step function; $w_{ij}$ is a coupling node unit (CNU) between node i and image component j (for example, grayscale value of a certain pixel j); kj is an image component 'j' (for example, grayscale value of a certain pixel j); $Th_X$ is a constant Threshold value, where 'x' is 'S' for Signature and 'RS' for Robust Signature; and Vi is a Coupling Node Value.

The Threshold values $Th_X$ are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$ $$1 - p(V > Th_S) - 1 - (1-\epsilon)^l \ll 1$$

i.e., given that l nodes (cores) constitute a Robust Signature of a certain image I, the probability that not all of these l nodes will belong to the Signature of same, but noisy image, • is sufficiently low (according to a system's specified accuracy).

2: $p(V_i > Th_{RS}) \approx l/L$ i.e., approximately 1 out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in the co-pending U.S. patent application Ser. No. 12/084,150 referenced above.

Figure 5:
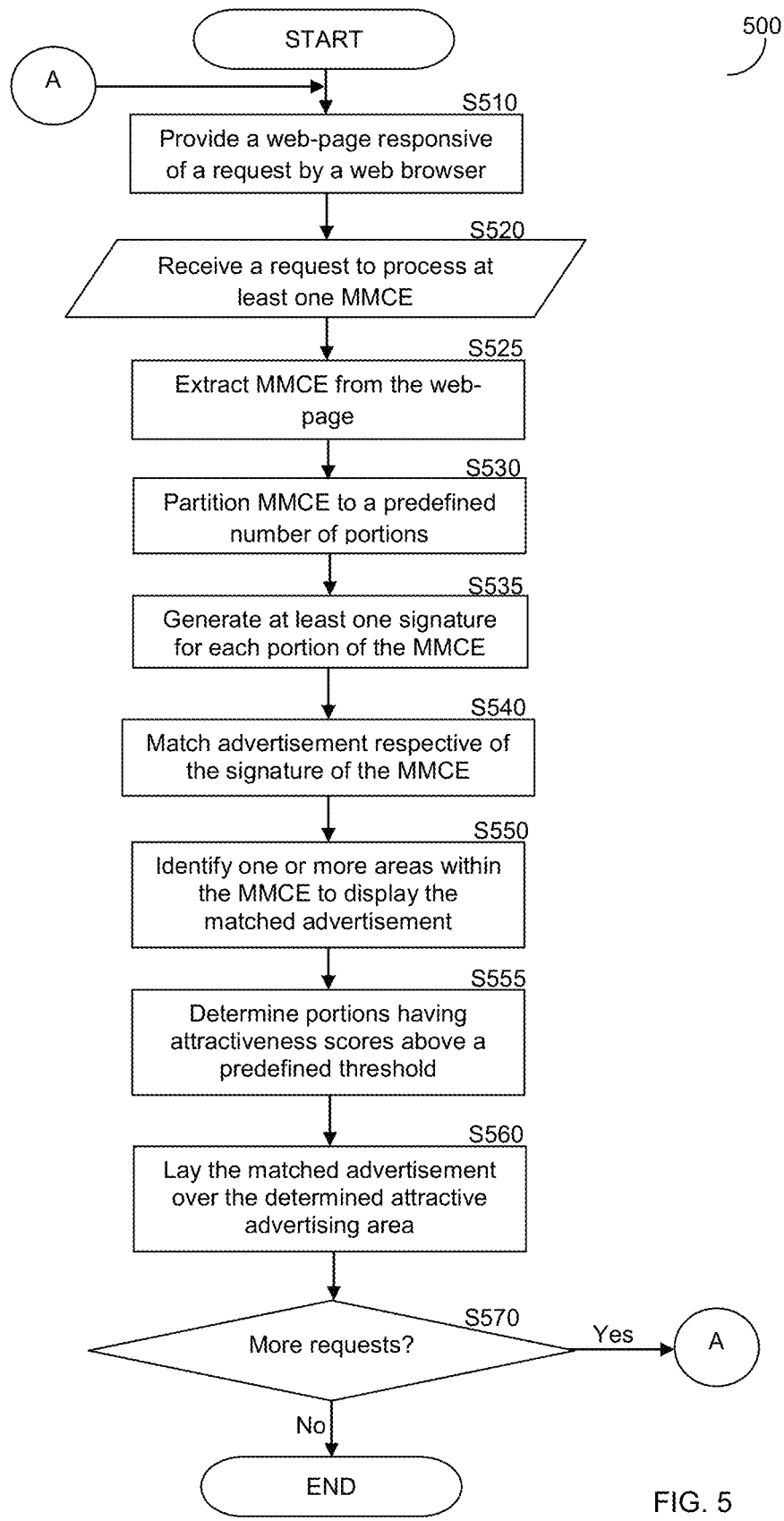
FIG. 5 is a flowchart describing a method for determining an area within the multimedia content of which an advertisement can be displayed according to one embodiment.

FIG. 5 depicts an exemplary and non-limiting flowchart 500 describing a method for detecting attractive advertising areas within a multimedia content element and matching advertisements for display in the detected areas according to one embodiment.

In S510, a web-page is provided responsive of a request by one of the web-browsers (e.g., web-browser 120-1). In S520, a request is received to process at least one multimedia content element contained in the uploaded web-page, for the purpose of detecting attractive advertising areas and matching advertisements. The request and the web-page can be received from a publisher server (e.g., a server 150-1), a script running on the uploaded web-page, or an agent (e.g., an add-on) installed in the web-browser. In S525, the multimedia content element is extracted from the web-page.

In S530, the multimedia content element is partitioned into a predefined number of portions. This number may be a configurable parameter of the server 130. For example, an image may be partitioned into blocks having equal or non-equal size.

In S535, at least one signature is generated for each portion of the multimedia content element. In one embodiment, each of the at least one signatures is robust to noise and distortion and is generated by the SGS 140 as described hereinabove. In S540, an advertisement item is matched to the each portion of the multimedia content respective of its generated signature. Alternatively or collectively, all signatures generated for the various portions are clustered, and an advertisement is matched to the clustered signature. The operation of S540 is described in detail hereinabove, at least with reference to FIG. 2. In one embodiment, the matching of an advertisement to a signature can be performed by the computational cores that are part of a large scale matching discussed in detail hereinabove.

In S550, one or more attractive advertising areas are identified within the multimedia content element, for display of one or more of the matched advertisements. With this aim, the at least one signature generated for each portion of the multimedia content element is analyzed. The signature analysis includes determination of the texture uniformity, margin of the respective portion, the location of a portion within the multimedia element, and so on. An image texture is a set of metrics calculated in image processing designed to quantify the perceived texture of an image. The Image texture provides information about the spatial arrangement of color or intensities in an image or selected region of an image Based on the analysis, each portion is assigned with an attractiveness score, indicating how the portion is likely to attract viewers' attention without damaging the overall appearance of the multimedia content element. For example, a center portion of the element would have a higher score relative to other portions.

In S555, portions having attractiveness scores above a predefined threshold are determined to be attractive advertising areas. The predefined threshold may be a configurable parameter of the server 130.

In S560, the matching advertisements are overlaid on the determined attractive advertising areas. It should be noted that not all matching advertisements may be used for this purpose, but rather only the number of matching advertisements that can fit within the determined areas. The overlaid advertisements are displayed as part of the received multimedia content element.

In one embodiment, the display of the one or more matching advertisements over the determined area may be displayed upon a user's gesture. The user's gesture may be, for example, a scroll over on the multimedia content element, a mouse click or a tap on the multimedia content, and so on. According to another embodiment, an advertising element may be integrated to be shown as part of the multimedia content element. For example, in order to advertise a soft drink within an image of a man sitting on a beach, a bottle of the soft drink may be displayed in the man's right hand.

In S570 it is checked whether there are additional requests, and if so, execution continues with S510; otherwise, execution terminates.

Figure 6:
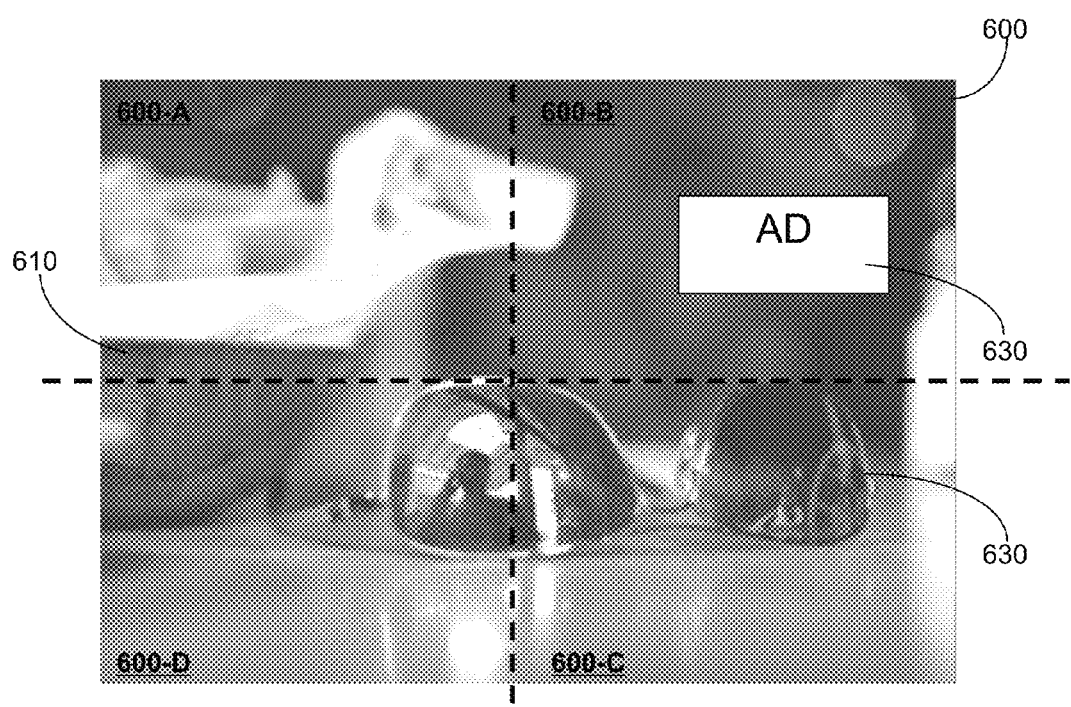
FIGS. 6 and 7 are screenshots of images showing an area within the image selected for the display of an advertisement according to an embodiment.

An example of the operation of the method described with reference to FIG. 5 and the option of the server 130 is provided in FIG. 6. A request to match an advertisement to an image 600 displayed over a web-page is received. The image 600 is partitioned into 4 different portions 600-A, 600-B, 600-C, and 600-D. For each portion at least one signature is generated by the SGS 140, which is then analyzed by the server 130. The analysis result would determine that the portion 600-B does not include any displayed object and its texture is flat, thus portion 600-B is determined as the attractive advertising area and an advertisement 630 may be displayed in this area. The advertisement may be related to sunglasses 620 or a salad bowl 610.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting at least one advertising attractive area within a multimedia content element over which an advertisement item can be displayed, comprising:

extracting the multimedia content element from a webpage; partitioning the multimedia content element into a predefined number of portions;

generating at least one signature for each portion of the multimedia content element;

analyzing the at least one signature generated for each portion of the multimedia content element, wherein the analysis includes determination of texture uniformity, margin of the respective portion, and a location of the portion within the multimedia content element; and identifying at least one attractive advertising area within the multimedia content element based on the signature analysis.

2. The method of claim 1, wherein identifying the at least one attractive advertising area further comprises:

assigning each portion with an attractiveness score based on the analysis of the respective at least one signature; and determining each portion having an attractiveness score above a predefined threshold as an attractive advertising area.

3. The method of claim 2, further comprising:

matching at least one advertisement item to each of the portion of the multimedia content elements respective of its at least one generated signature.

4. The method of claim 3, further comprising:

laying the at least one matching advertisement item over the at least one attractive advertising area.

5. The method of claim 4, wherein the at least one advertisement item displayed respective of a gesture of a user is detected by a user node configured to display the web-page.

6. The method of claim 5, wherein the user gesture is any one of: a scroll on the multimedia content element, a tap on the multimedia content element, a mouse click on the multimedia content element, a response to the multimedia content element.

7. The method of claim 1, further comprising:

clustering the at least one signature generated for each portion of the multimedia content element; and matching at least an advertisement item to each of the portions of the multimedia content element respective of the clustered signature.

8. The method of claim 1, wherein the multimedia content element is at least one of: an image, graphics, a video stream, a video clip, an audio stream, an audio clip, a video frame, a photograph, images of signals, and portions thereof.

9. A non-transitory computer readable medium having stored thereon instructions for causing one or more processing units to execute the method according to claim 1.

10. A system for detecting at least an advertising attractive area within a multimedia content element over which an advertisement item can be displayed, comprising:

an interface to a network for receiving a webpage containing at least one multimedia content element; and a processing unit;

a memory coupled to the processing unit, the memory contains instructions that when executed by the processing unit configure the system to:

extract the multimedia content element from a web-page;

partition the multimedia content element into a predefined number of portions;

analyze the at least one signature generated for each portion of the multimedia content element, wherein the analysis includes determination of texture uniformity, margin of the respective portion, and a location of the portion within the multimedia content element; and identify at least one attractive advertising area within the multimedia content element based on the signature analysis.

11. The system of claim 10, further comprising:
a signature generator system for generating at least one signature for each portion of a multimedia content element, wherein the at least one signature is robust to noise and distortions.

12. The system of claim 11, wherein the signature generator system comprises a plurality of computational cores enabled to receive the multimedia content elements, each computational core of the plurality of computational cores having properties that are at least partly statistically independent of other of the computational cores, the properties are set independently of each other core.

13. The system of claim 12, wherein the system is further configured to identify the at least one attractive advertising area by:
assigning each portion with an attractiveness score based on the analysis of the respective at least one signature; and
determining each portion having an attractiveness score above a predefined threshold as an attractive advertising area.

14. The system of claim 13, wherein the system is further configured to:
match at least one advertisement item to each of the portions of the multimedia content element respective of its at least one generated signature.

15. The system of claim 14, wherein the system is further configured to:
lay the at least one matching advertisement over the at least one attractive advertising area.

16. The system of claim 14, further comprising:
a database for maintaining the at least one matching advertisement item.

17. The system of claim 13, wherein system is further configured to:
cluster the at least one signature generated for each portion of the multimedia content element; and
match at least an advertisement item to each of the portions of the multimedia content element respective of the clustered signature.

18. The system of claim 10, wherein the multimedia content element is at least one of: an image, graphics, a video stream, a video clip, an audio stream, an audio clip, a video frame, a photograph, images of signals, combinations thereof, and portions thereof.

* * * * *